(12) United States Patent
Kim et al.

(10) Patent No.: US 11,014,201 B2
(45) Date of Patent: May 25, 2021

(54) LASER WELDING APPARATUS

(71) Applicants: Hyundai Motor Company, Seoul (KR); Kia Motors Corporation, Seoul (KR); Wooshin Industrial Co., Ltd., Chungcheongnam-do (KR)

(72) Inventors: Duck Whan Kim, Gyeonggi-do (KR); Kwi Seong Jeong, Gyeonggi-do (KR); Jung Han Yu, Gyeonggi-do (KR); Young Bum Kum, Seoul (KR); Young Je Lee, Gyeonggi-do (KR); Tae Min Lee, Seoul (KR); Yong Woo Choi, Gyeonggi-do (KR); Chang Jun Lee, Gyeonggi-do (KR)

(73) Assignees: Hyundai Motor Company, Seoul (KR); Kia Motors Corporation, Seoul (KR); Dong Yang Piston Co., Ltd., Gyeonggi-do (KR)

( * ) Notice: Subject to any disclaimer, the term of this patent is extended or adjusted under 35 U.S.C. 154(b) by 339 days.

(21) Appl. No.: 16/039,064

(22) Filed: Jul. 18, 2018

(65) Prior Publication Data

US 2019/0184502 A1 Jun. 20, 2019

(30) Foreign Application Priority Data

Dec. 15, 2017 (KR) .......................... 10-2017-0173610

(51) Int. Cl.
| | | |
|---|---|---|
| *B23K 37/04* | (2006.01) | |
| *H01M 8/04* | (2016.01) | |
| *B23K 26/26* | (2014.01) | |
| *B23K 26/70* | (2014.01) | |
| *B23K 26/324* | (2014.01) | |
| *B23K 26/244* | (2014.01) | |
| *H01M 50/147* | (2021.01) | |

(52) U.S. Cl.
CPC ........ *B23K 37/0443* (2013.01); *B23K 26/244* (2015.10); *B23K 26/26* (2013.01); *B23K 26/324* (2013.01); *B23K 26/702* (2015.10); *H01M 8/04* (2013.01); *H01M 50/147* (2021.01)

(58) Field of Classification Search
CPC . B23K 37/0443; B23K 26/244; B23K 26/702
USPC ........................... 219/121.63, 121.6, 121.62
See application file for complete search history.

(56) References Cited

U.S. PATENT DOCUMENTS

| | | | |
|---|---|---|---|
| 5,948,292 A * | 9/1999 | Tanaka ................ | B23K 26/046 |
| | | | 219/121.6 |
| 2009/0159579 A1* | 6/2009 | Nishio ............... | B23K 37/0408 |
| | | | 219/121.63 |

* cited by examiner

*Primary Examiner* — Tu B Hoang
*Assistant Examiner* — Thomas J Ward
(74) *Attorney, Agent, or Firm* — Mintz Levin Cohn Ferris Glovsky and Popeo, P.C.; Peter F. Corless

(57) ABSTRACT

A laser welding apparatus for laser-welding a first welding target and a second welding target seated on the first welding target includes a first jig on which the first welding target is seated, a second jig configured to press the first welding target such that the first welding target is adhered to the first jig, a third jig configured to press the second welding target such that the second welding target is adhered to the first welding target, one or more connection members connecting the second jig and the third jig such that the second welding target is pressed by the second jig when the first welding target is pressed by the first jig, and a laser head configured to laser-weld the first welding target and the second welding target by irradiating a laser beam to a specific welding part of the second welding target.

11 Claims, 4 Drawing Sheets

LASER WELDING APPARATUS

CROSS-REFERENCE TO RELATED APPLICATION

This application claims under 35 U.S.C. § 119(a) the benefit of Korean Patent Application No. 10-2017-0173610, filed on Dec. 15, 2017 in the Korean Intellectual Property Office, the entire contents of which are incorporated by reference herein.

BACKGROUND

(a) Technical Field

The present disclosure relates to a laser welding apparatus.

(b) Description of the Related Art

In general, a fuel cell stack is equipped with a manifold block having a plurality of manifolds for supplying reaction gases and cooling water to the fuel cell stack or discharging the reaction gases and the cooling water from the fuel cell stack. Further, hydrogen supply systems, such as a hydrogen blocking valve, a hydrogen supply valve, a hydrogen purge valve, a water trap valve, a drain valve, and a hydrogen ejector, are mounted on the manifold block to act as a module. The manifold block has a complex structure provided with manifolds and the hydrogen supply systems in a narrow space.

Conventionally, a plurality of aluminum cast products are coupled to manufacture a manifold block. However, the conventional manifold block formed of an aluminum material has disadvantages in that it is necessary to perform PEO coating on aluminum cast products to prevent discharge of aluminum ions that may deteriorate the performance of a membrane electrode assembly, which lowers productivity, and the low-temperature start performance of the fuel cell stack deteriorates because the temperature of air that passes through the air supply manifold of the manifold block becomes lower during the low-temperature start of the fuel cell stack due to the high heat transfer rate of the aluminum material.

To solve this, a method of manufacturing a manifold back by laser-welding synthetic resin components is provided. However, the synthetic resin components are often bent by a specific degree or more due to limits of the manufacturing processes. Accordingly, when the synthetic resin components are laser-welded to manufacture a manifold block, it is difficult to adhere the synthetic resin components due to the bending of the synthetic resin components during the laser-welding, and it is difficult to accurately irradiate the laser beam to the welding parts as the synthetic resin components are distorted when the laser beam is sequentially irradiated to the welding parts.

SUMMARY

Embodiments of the present disclosure provide a laser welding apparatus, the structure of which is improved such that welding targets are adhered during laser welding.

Embodiments of the present disclosure also provide a laser welding apparatus, the structure of which is improved such that welding targets may be prevented from being distorted during laser welding.

In accordance with an aspect of the present disclosure, there is provided a laser welding apparatus for laser-welding a first welding target and a second welding target seated on the first welding target, the laser welding apparatus including a first jig on which the first welding target is seated, a second jig configured to press the first welding target such that the first welding target is adhered to the first jig, a third jig configured to press the second welding target such that the second welding target is adhered to the first welding target, one or more connection members connecting the second jig and the third jig such that the second welding target is pressed by the second jig when the first welding target is pressed by the first jig, and a laser head configured to laser-weld the first welding target and the second welding target by irradiating a laser beam to a specific welding part of the second welding target.

Each of the connection members may include an elastic member configured to provide an elastic force to the second jig such that the second welding target is elastically pressed by the second jig when the first welding target is pressed by the first jig.

The elastic member may be a coil spring.

Each of the connection members may further include a guide pin interposed between the elastic member and the third jig.

The second jig may include a pressing wall configured to press a specific pressing part of the first welding target, and each of the connection members may have a specific length such that the second welding target is elastically pressed by the third jig when the pressing part is pressed by the pressing wall.

The first welding target may be a main body of a manifold block for a fuel cell, and the second welding target may be a cover that is combined with the main body to constitute a passage for a reaction gas or cooling water.

The cover may include a passage part configured to form the passage, and a welding part formed along a circumference of the passage part to be seated on the main body, and the third jig may have an area corresponding to the passage part such that the welding part is adhered to the main body by selectively pressing the passage part.

The third jig may be formed of an elastically deformable flexible material to be adhered to the passage part.

The laser head may be installed such that the laser beam transmits the second jig to be irradiated to the welding target.

The second jig may include a laser transmission window mounted to a part corresponding to the welding part to transmit the laser beam.

The laser welding apparatus may further include a feeding member configured to reciprocally feed the first jig such that the first jig becomes closer to the second jig or far away from the second jig.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
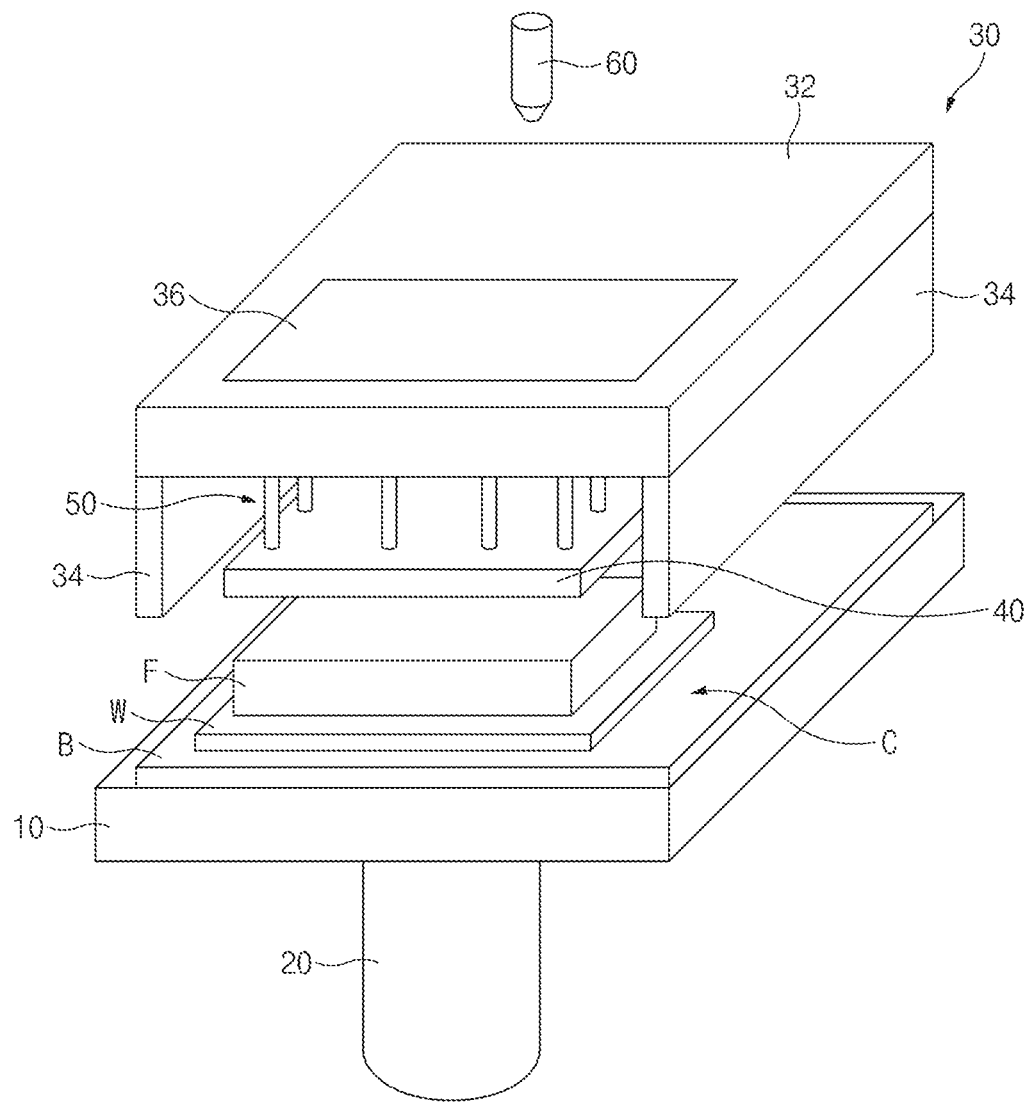
FIG. 1 is a perspective view of a laser welding apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Figure 2:
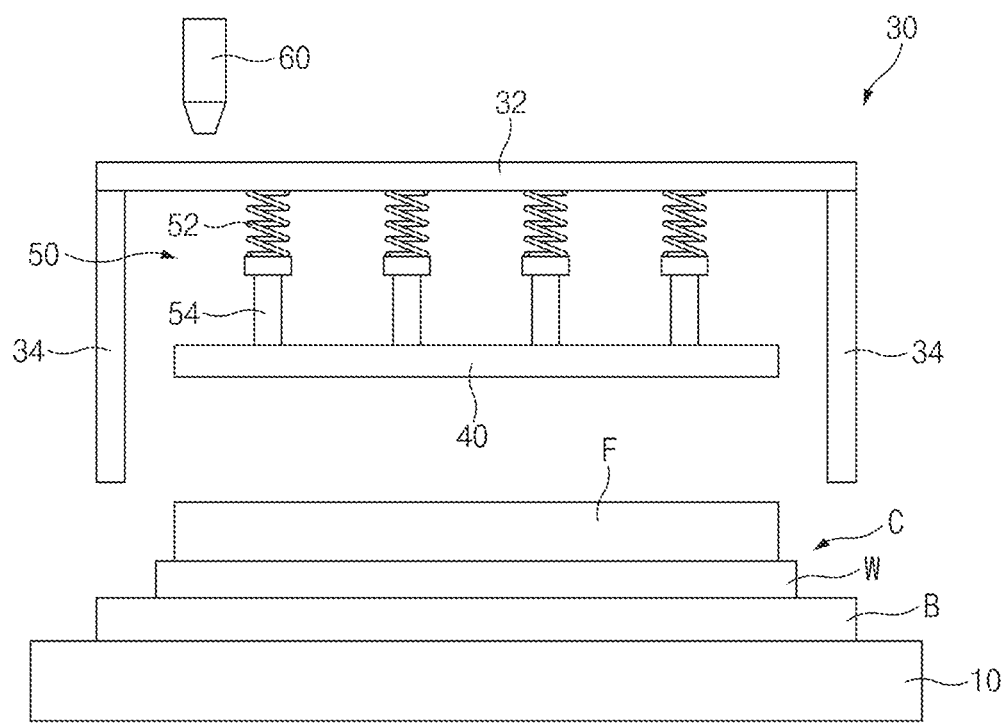
FIG. 2 is a front view of the laser welding apparatus of FIG. 1.
Figure 3:
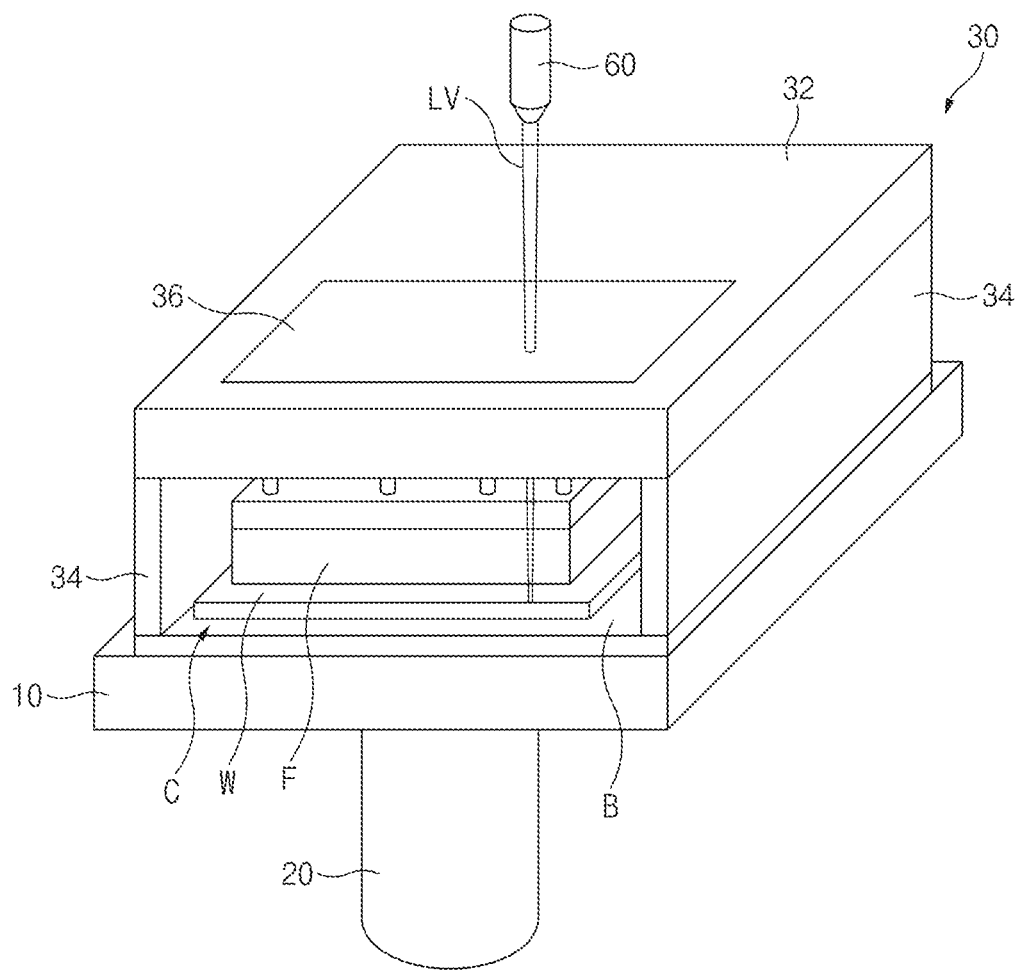
FIGS. 3 and 4 are views illustrating a method for laser-welding welding targets by using the laser welding apparatus of FIG. 1.
Figure 4:
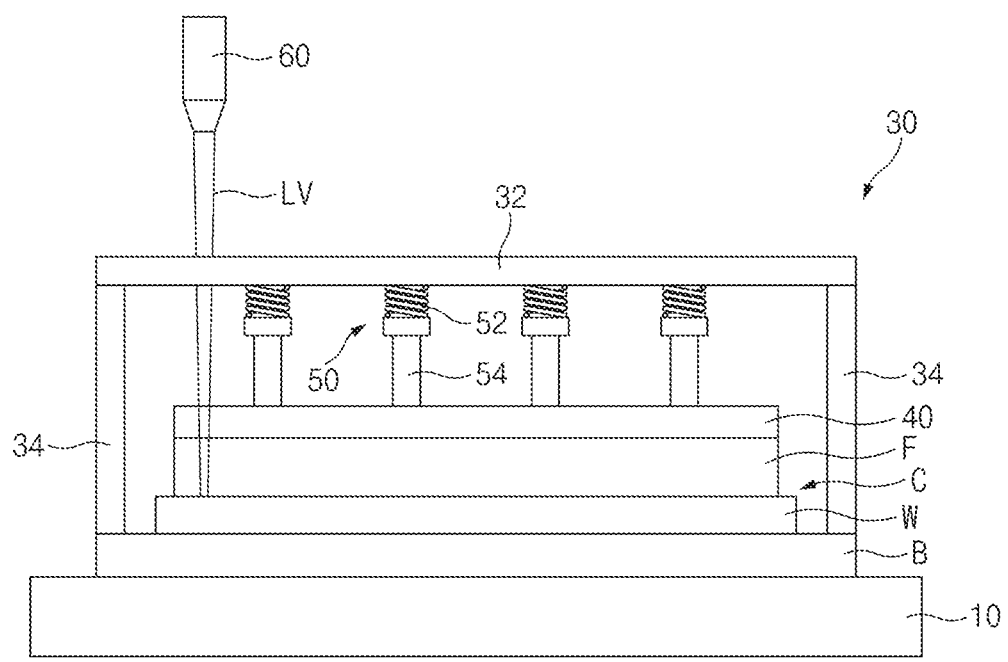

FIG. 1 is a perspective view of a laser welding apparatus according to an embodiment of the present disclosure. FIG. 2 is a front view of the laser welding apparatus of FIG. 1. FIGS. 3 and 4 are views illustrating a method for laser-welding welding targets by using the laser welding apparatus of FIG. 1.

Referring to FIGS. 1 and 2, the present disclosure relates to a laser welding apparatus for laser-welding a first welding target and a second welding target seated on the first welding target, and a laser welding apparatus according to an embodiment of the present disclosure may include a first jig 10 on which a first welding target is seated, a feeding member 20 that may reciprocally feed the first jig 10, a second jig 30 that may press the first welding target such that the first welding target is adhered to the first jig 10, a third jig 40 that may press the second welding target such that the second welding target is adhered to the first welding target, a connection member 50 that connects the second jig 30 and the third jig 40, and a laser head 60 that laser-welds the first welding target and the second welding target.

The types of welding targets that may be laser-welded by using the laser welding apparatus 1 are not specifically limited. For example, the first welding target may be a main body B of a manifold block for a fuel cell, and the second welding target may be a cover C that may be combined with the main body B to constitute a passage of a reaction gas or cooling water. As illustrated in FIG. 1, the main body B may have a flat plate shape having a specific area, and correspondingly, the cover C may include a passage part F that may constitute a passage of a reaction gas or cooling water, and a welding part W that is formed in the form of a flange along a circumference of the passage part F to be seated on an upper surface of the main body B. Further, the main body B and the cover C may be formed of a synthetic resin material. Hereinafter, a case in which the first welding target is the main body B and the second welding target is the cover C will be described as an example in the present disclosure.

First, as illustrated in FIG. 1, the first jig 10 has a flat plate shape having a specific area. Although it is preferable that the first jig 10 be formed of a material, such as steel or aluminum, which has a high strength, the present disclosure is not limited thereto. A bottom surface of the main body B is seated on an upper surface of the first jig 10.

Next, as illustrated in FIG. 1, the feeding member 20 is coupled to the first jig 10 such that the first jig 10 may be fed. The kind of the feeding member 20 is not specifically limited. For example, the feeding member 20 may be a hydraulic cylinder. As illustrated in FIGS. 1 and 3, the feeding member 20 may reciprocally feed the first jig 10 such that the first jig 10 may become closer to the second jig 30 or far away from the second jig 30. In this way, as the first jig 10 is reciprocally fed by the feeding member 20, the main body B and the cover C seated on the upper surface of the main body B may be selectively pressed by the second jig 30 and the third jig 40, respectively.

Next, as illustrated in FIG. 1, the second jig 30 may include a body 32 formed to face the main body B seated on the first jig 10, a pressing wall 34 formed to press a specific pressing part of the main body B, and a laser transmission window 36 formed to transmit a laser beam LV. Although it is preferable that the second jig 30 be formed of a material, such as steel or aluminum, which has a high strength, the present disclosure is not limited thereto.

As illustrated in FIG. 2, the body 32 has a flat plate shape having a specific area, and is disposed to face the upper surface of the main body B seated on the upper surface of the first jig 10.

As illustrated in FIGS. 2 and 4, the pressing wall 34 extends from the body 20 towards the first jig 10 by a specific length to selectively contact a specific pressing part of the main body B when the first jig 10 is fed closer to the second jig 30. The pressing part of the main body B is not specifically limited. For example, the pressing part of the main body B may be opposite ends of the main body B. In this case, a pair of pressing walls 34 may be formed to press the opposite ends of the main body B. The pressing wall 34 may press the pressing portion of the main body B such that the main body B is adhered to the first jig 10. The pressing wall 34 may expand a specific part of the main body B that is bent due to a limit of the manufacturing process such that the specific part of the main body B is adhered to the first jig 10 when the main body B and the cover C are laser-welded to each other, and may prevent the main body B from being distorted by heat applied by the laser beam LV. Through this, the pressing wall 34 may prevent the laser welding quality from deteriorating due to the bending or distortion of the main body B.

As illustrated in FIG. 1, the laser transmission window 36 is installed in the body 32, and is formed of a material, of which the absorption rate of the laser beam LV is low, such that the laser beam LV may transmit the laser transmission window 36. It is preferable that the material of the laser transmission window 36 is determined differently according to a wavelength and a source of the laser beam LV for laser-welding the main body B and the cover C. The laser transmission window 36 is installed at a location corresponding to the welding part of the cover C such that the laser beam LV emitted from the laser head 60 transmits the laser transmission window 36 to be irradiated to a specific welding part of the cover C. For example, as illustrated in FIG. 4, when the welding part W of the cover C is laser-welded to the main body B, the laser transmission window 36 may be installed at a location corresponding to the welding part W of the cover C.

Next, the third jig 40 is disposed between the first jig 10 and the second jig 30 to face a specific pressing part of the cover C. For example, as illustrated in FIG. 2, the third jig 40 is disposed between the first jig 10 and the second jig 30 to face the passage part F of the cover C. The third jig 40 has an area corresponding to the passage part F of the cover C to selectively press the passage part F of the cover C. The third jig 40 is formed of a flexible material to be elastically deformed according to the shape of the passage part F of the cover C.

Next, the connection member 50 is installed between the second jig 30 and the third jig 40 to connect the second jig 30 and the third jig 40. As illustrated in FIGS. 2 and 4, the connection member 50 is configured such that the passage part F of the cover C may be elastically pressed by the second jig 30 when the opposite ends of the main body B is pressed by the pressing walls 34 of the first jig 10. The structure of the connection member 50 is not specifically limited. For example, as illustrated in FIG. 2, the connection member 50 may have an elastic member 52 that may provide an elastic force to the third jig 40, and a guide pin 54 interposed between the elastic member 52 and the third jig 40.

The elastic member 52 is installed such that an upper end of the elastic member 52 is fixed to a bottom surface of the second jig 30. The kind of the elastic member 52 is not specifically limited. For example, as illustrated in FIG. 2, the elastic member 52 may be a coil spring that may extends or contracts in a reciprocal feeding direction of the first jig 10.

An upper end of the guide pin 54 is fixed to a lower end of the elastic member 52 and a lower end of the guide pin 54 is fixed to an upper end of the third jig 40 to be interposed between the elastic member 52 and the third jig 40. The guide pin 54 may transmit the elastic force applied by the elastic member 52 to the third jig 40.

As illustrated in FIG. 4, the third jig 40 contacts the passage part F of the cover C to be pushed towards the second jig 30 when the first jig 10 is fed towards the second jig 30 by the feeding member 20. Then, the guide pin 54 is pushed towards the second jig 30 by the third jig 40, and the elastic member 52 is pressed by the guide pin 54 to be elastically compressed. The elastically compressed elastic member 52 provides an elastic force to the third jig 40 by the medium of the guide pin 54. The third jig 40 may elastically press the passage part F of the cover C through the elastic force provided by the elastic member 52 such that the welding part W of the cover C is adhered to the upper surface of the main body B. Accordingly, a specific part of the cover C that is bent due to a limit of the manufacturing process such that the specific part of the cover C is adhered to the main body B when the main body B and the cover C are laser-welded to each other, and the cover C may be prevented from being distorted by heat applied by the laser beam LV. Through this, the third jig 40 may prevent the laser welding quality from deteriorating due to the bending or distortion of the cover C.

It is preferable that the connection member 50 be provided such that the pressing part of the main body B is pressed by the pressing wall 34 of the second jig 30 in a state in which the passage part F of the cover C is elastically pressed by the third jig 40. To achieve this, the connection member 50 may have a specific length such that the pressing part of the main body B contacts the pressing wall 34 of the second jig 30 to be pressed by the pressing wall 34 of the second jig 30 after the passage part F of the cover C contacts the third jig 40 to be elastically pressed by the third jig 40.

The number of the installed connection members 50 is not limited thereto, and at least one connection member 50 may be installed. For example, as illustrated in FIG. 2, the plurality of connection members 50 may be installed at a specific interval.

Meanwhile, although it has been described that the connection member 50 includes the elastic member 52 and the guide pin 54, the present disclosure is not limited thereto. For example, the connection member 50 may include a cylinder device.

Next, the laser head 60 may laser-weld the welding part W of the C and a specific part of the main body B on which the welding part W of the cover C is seated, by irradiating a laser beam V oscillated by a laser oscillator (not illustrated) to the welding part W of the cover C. For example, as illustrated in FIG. 4, the laser head 60 may sequentially irradiate the laser beam Lv to the welding part W of the cover C in a specific order through the laser transmission window 36 of the first jig 10 in a state in which the main body B is attached to the first jig 10 by the pressing wall 34 of the second jig 30 and the welding part W of the cover C is attached to the main body B by the third jig 40. Then, the welding part W of the cover C and the specific party of the main body B in contact with the welding part W of the cover C may be sequentially fused by the heat applied by the laser beam LV to be welded to each other.

Not a whole area of the welding part W of the cover C is welded to the main body B but a local part of the welding part W of the cover C is fused and welded to the main body B in the order in which the laser beam LV is irradiated. Accordingly, because the shape of the cover C is changed while the welding part W of the cover C is locally fused, the passage part F of the cover C may not be smoothly pressed by the third jig 40. However, the third jig 40 is formed of an elastically deformable flexible material according to the change of the shape of the cover C, and the plurality of connection members 50 are installed at a specific interval. Accordingly, if the shape of the cover C is changed due to the local fusion of the welding part W of the cover C, the third jig is elastically deformed according to the deformed shape of the cover C while the elastic member 52 of the connection member 50 disposed at a location corresponding to the shape deformed part is elastically deformed Accordingly, because the third jig 40 may continuously adhere the welding part W to the main body B even though the welding part W is locally fused, the laser welding quality may be further improved through this.

The present disclosure relates to a laser welding apparatus and has the following effects.

First, the present disclosure may improve the laser welding quality by laser-welding the welding targets while the welding targets are adhered to each other by individually pressing the welding targets.

Second, the present disclosure may further improve the laser welding quality by uniformly pressing the welding targets while compensating the changes of the shapes of the welding targets due to the local fusion of the welding targets.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A laser welding apparatus for laser-welding a first welding target and a second welding target seated on the first welding target, the laser welding apparatus comprising:
   a first jig on which the first welding target is seated;
   a second jig configured to press the first welding target such that the first welding target contacts the first jig;
   a third jig configured to press the second welding target such that the second welding target contacts the first welding target;
   one or more connection members connecting the second jig and the third jig such that the second welding target is pressed by the third jig when the first welding target is pressed by the second jig; and
   a laser head configured to laser-weld the first welding target and the second welding target by irradiating a laser beam to a specific welding part of the second welding target,
   wherein the second jig includes a pressing wall separated from the third jig, the pressing wall configured to press a specific pressing part of the first welding target, and
   wherein the pressing wall is configured to contact the first welding target after the third jig contacts the second welding target.

2. The laser welding apparatus of claim 1, wherein each of the connection members includes an elastic member configured to provide an elastic force to the second jig such that the second welding target is elastically pressed by the third jig when the first welding target is pressed by the second jig.

3. The laser welding apparatus of claim 2, wherein the elastic member is a coil spring.

4. The laser welding apparatus of claim 2, wherein each of the connection members further includes a guide pin interposed between the elastic member and the third jig.

5. The laser welding apparatus of claim 2, wherein each of the connection members has a specific length such that the second welding target is elastically pressed by the third jig when the pressing part is pressed by the pressing wall.

6. The laser welding apparatus of claim 1, wherein the first welding target is a main body of a manifold block for a fuel cell, and
   wherein the second welding target is a cover that is combined with the main body to constitute a passage for a reaction gas or cooling water.

7. The laser welding apparatus of claim 6, wherein the cover includes:
   a passage part configured to form the passage for the reaction gas or cooling water; and
   a welding part formed along a circumference of the passage part to be seated on the main body, and
   wherein the third jig has an area corresponding to the passage part such that the welding part contacts the main body by selectively pressing the passage part.

8. The laser welding apparatus of claim 7, wherein the third jig is formed of an elastically deformable flexible material to contact the passage part.

9. The laser welding apparatus of claim 1, wherein the laser head is installed such that the laser beam transmits the second jig to be irradiated to the welding target.

10. The laser welding apparatus of claim 9, wherein the second jig includes:
    a laser transmission window mounted to a part corresponding to the welding part to transmit the laser beam.

11. The laser welding apparatus of claim 1, further comprising:
    a feeding member configured to reciprocally feed the first jig such that the first jig becomes closer to the second jig or far away from the second jig.

* * * * *